(12) United States Patent
Hacikyan

(10) Patent No.: US 8,017,207 B2
(45) Date of Patent: Sep. 13, 2011

(54) DEGRADABLE PAPER WITH LONG-SHELF-LIFE ADHESIVE BACKING

(76) Inventor: Michael Hacikyan, Amherst, NY (US)

( * ) Notice: Subject to any disclaimer, the term of this patent is extended or adjusted under 35 U.S.C. 154(b) by 918 days.

(21) Appl. No.: 11/936,389

(22) Filed: Nov. 7, 2007

(65) Prior Publication Data

US 2009/0117377 A1    May 7, 2009

(51) Int. Cl.
*B32B 9/00* (2006.01)
*B32B 33/00* (2006.01)
*B32B 7/12* (2006.01)
*B29C 65/00* (2006.01)

(52) U.S. Cl. ...... 428/40.1; 428/41.8; 428/343; 428/354; 156/60; 156/289

(58) Field of Classification Search .......... 428/40.1, 428/41.6–41.8, 42.1, 343, 354; 156/60, 289
See application file for complete search history.

(56) References Cited

U.S. PATENT DOCUMENTS

| 4,370,370 A * | 1/1983 | Iwata et al. ............ 428/41.6 |
| 4,424,245 A * | 1/1984 | Maruta et al. ........... 503/209 |
| 5,427,997 A * | 6/1995 | Oshima et al. ........... 503/227 |
| 6,787,208 B2 * | 9/2004 | Galovic ................. 428/40.1 |

* cited by examiner

*Primary Examiner* — Patricia L Nordmeyer
(74) *Attorney, Agent, or Firm* — Walter W. Duft

(57) ABSTRACT

A degradable paper article with long-shelf-life adhesive backing, together with a related fabrication method. The article includes a layer of degradable paper, a layer of degradable pressure sensitive adhesive, a release liner on the adhesive layer, and a degradable polymer blocking layer disposed between the adhesive layer and the paper layer that blocks adhesive from bleeding into said paper.

22 Claims, 3 Drawing Sheets

| WATER SOLUBLE PAPER |
|---|
| WATER SOLUBLE ADHESIVE |
| RELEASE LINER |

*FIG. 1 (PRIOR ART)*

| WATER SOLUBLE PAPER |
|---|
| BARRIER COATING |
| WATER SOLUBLE ADHESIVE |
| RELEASE LINER |

*FIG. 2 (PRIOR ART*

DEGRADABLE PAPER WITH LONG-SHELF-LIFE ADHESIVE BACKING

BACKGROUND OF THE INVENTION

1. Field of the Invention

The present invention relates generally to adhesive paper products such as labels, tape and the like. More particularly, the invention is directed to adhesively backed paper that is soluble or otherwise degradable in water or other liquids.

2. Description of Prior Art

By way of background, water soluble paper laminates for use as adhesive tape and labels have been constructed with a layer of water soluble paper backed by a layer of water soluble, pressure-sensitive adhesive having a peelable release liner (adhesive backing). This prior art construction is shown in FIG. 1. During use, the release liner is peeled off and the adhesive side of the tape or label is adhered to a surface. A disadvantage of the construction of FIG. 1 is that the adhesive properties may be degraded if the material is stored too long (e.g., more than a few months) or is stored improperly (e.g., exposed to extreme temperature or humidity, direct sunlight, etc.).

In an attempt to address the foregoing problem, a barrier coating made from unknown material has been applied between the paper and the adhesive backing. This modified construction is shown in FIG. 2. The solution of FIG. 2 has been shown to provide a shelf life of approximately 3-6 months.

It is to improvements in the above-described field that the present invention is directed. What is needed is a solution that further extends the shelf life of a degradable adhesively-backed paper product beyond what is presently achievable.

SUMMARY OF THE INVENTION

The foregoing problems are solved and an advance in the art is provided by a degradable paper article with a long-shelf-life adhesive backing, together with a related fabrication method. The article includes a layer of degradable paper, a layer of degradable pressure sensitive adhesive, a release liner on the adhesive layer, and a degradable polymer blocking layer disposed between the adhesive layer and the paper layer as a blocking layer that blocks adhesive from bleeding into the paper.

According to exemplary embodiments disclosed herein, the paper layer may comprise water degradable paper, the adhesive may comprise water degradable adhesive, the release liner may comprise a water degradable release paper or film, and the polymer blocking layer may comprise polyvinyl alcohol. The polymer blocking layer may be provided as a film laminate or coextrusion, or as a liquid spray or other coating. The polymer blocking layer may be in direct contact with the adhesive layer or in direct contact with the paper layer. Alternatively, a barrier coating may be disposed between the paper layer and the polymer blocking layer, or between the polymer blocking layer and the adhesive layer. The article may be configured in any desired manner, including as an adhesive label or adhesive tape.

BRIEF DESCRIPTION OF THE DRAWINGS

The foregoing and other features and advantages of the invention will be apparent from the following more particular description of preferred embodiments of the invention, as illustrated in the accompanying Drawings in which:

FIG. 1 is a side view of a prior art adhesively backed water degradable paper product;

FIG. 2 is a side view of another prior art adhesively backed water degradable paper product;

DETAILED DESCRIPTION OF PREFERRED EMBODIMENTS

Figure 3:
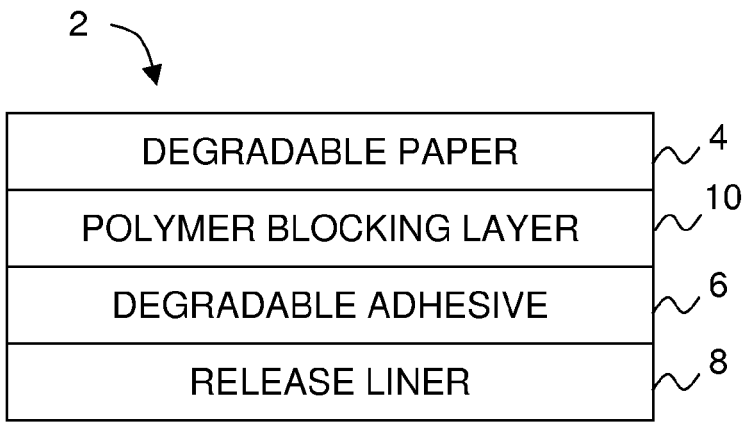
FIG. 3 is a side view of an adhesively backed degradable paper product constructed in accordance with the present disclosure.

Turning now to the Drawings, which are not necessarily to scale, FIG. 3 illustrates a degradable paper article 2 having a long-shelf-life adhesive backing. Although the article 2 is shown in bulk (e.g., roll) form, it may be cut into any shape for any desired application, including, adhesive labels, adhesive tape, etc.

The article 2 includes a first layer 4 comprising conventional paper that is degradable in some manner when exposed to water or other liquids. Examples include water soluble paper that dissolves in water. Additional examples include paper that is burstable, dispersible, disposable or otherwise degradable in water (or other liquids), such as tissue paper. The paper layer 4 may have any desired density (weight), with 30-50 grams/square meter being commonly used. The paper article 2 may further include an adhesive layer 6 backed by a release liner 8 that is peelable or otherwise removable from the adhesive layer. The adhesive layer 6 may be formed using any suitable liquid (e.g., water) degradable pressure sensitive adhesive and may be applied at any desired thickness, such as 20-25 microns. Examples include adhesives that are completely water soluble as well as "wash-away" adhesives that degrade when contacted with water while leaving a residue that can be washed away. The liner layer 8 may be formed using any suitable liquid (e.g., water) degradable release paper or film having any desired density, such as 50-90 grams/square meter.

Disposed between the paper layer 4 and the adhesive layer 6 is a degradable polymer blocking layer 10 that serves as a blocking layer to block the adhesive from bleeding into the paper. The polymer blocking layer 10 may comprise water soluble polyvinyl alcohol, also known as PVA, PVAL and PVOH. Other water degradable polymers could potentially also be used, as could polymers that are degradable in other liquids. The polymer blocking layer 10 can be incorporated into the article 2 in a variety of ways. One technique is to preform the polymer blocking layer 10 as a film and then laminate or co-extrude the film with the remaining layers 4, 6 and 8, or with either the paper layer 4 alone or a combination of the adhesive and liner layers 6 and 8. Still another technique is to spray or otherwise coat the polymer blocking layer 10 in liquid form onto the paper layer 4 or the adhesive layer 6.

Figure 4:
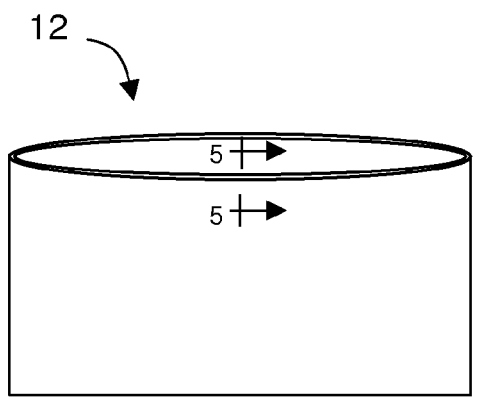
FIG. 4 is a perspective view of a prior art water soluble heat sealable pouch comprising an outer layer of water soluble paper and an inner layer of polyvinyl alcohol.
Figure 5:
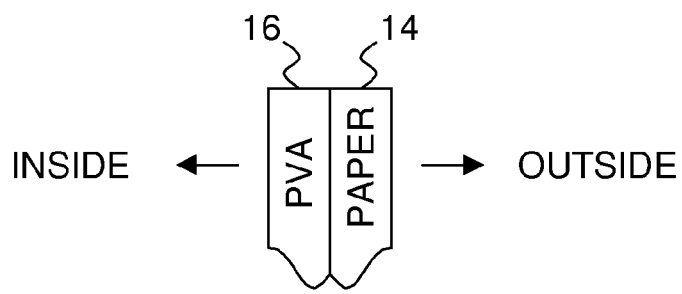
FIG. 5 is a cross-sectional view taken along line 5-5 in FIG. 4.

It should be noted that laminates and coextrusions of polyvinyl alcohol and water soluble paper have been used in the past to form water soluble heat sealable pouches (film on inside/paper on outside) for various applications, such as the transport of medical specimens. One such pouch 12 is shown in FIG. 4. As further shown in FIG. 5, the pouch 14 includes an outer layer 14 comprising water soluble paper and an inner layer 16 comprising polyvinyl alcohol. The paper layer 14 comprises water soluble paper having a weight of 30 grams/ square meter. The polyvinyl alcohol layer 16 has a thickness of 15 microns and is laminated or co-extruded with the paper layer 14. The laminate/co-extrusion material used to fabricate the pouch 12 of FIG. 4 is readily obtainable from commercial sources and thus may be conveniently used to provide the layers 4 and 10 of the article 2 shown in FIG. 3.

The thickness of the polymer blocking layer 10 may vary and depends in part on the fabrication technique used. At the low end of the thickness range, smaller thicknesses may be obtained by using a spraying or other coating technique than if the polymer blocking layer 10 is preformed as a film. Smaller thicknesses reduce the amount of polymer blocking layer material required. On the other hand, larger thicknesses provide an increased barrier between the paper layer 4 and the adhesive layer 6. Moreover, increasing the thickness of the polymer blocking layer 10 allows the thickness of the paper layer 4 to be reduced. This may provide a significant cost advantage if an expensive variety of paper is used.

Applicant has constructed the article 2 of FIG. 3 and tested its adhesive properties. To form the article 2, the paper layer 4 and the polymer blocking layer 10 were provided by the commercially available laminate-coextrusion material conventionally used to form the pouch 12 of FIGS. 4 and 5. Thus, the paper layer 4 comprised water soluble paper having a weight of 30 grams/square meter and the polymer blocking layer 10 comprised polyvinyl alcohol film having a thickness of 15 microns. The adhesive layer 6 comprised conventional water soluble adhesive and the liner layer 8 comprised a conventional glassine release paper. A portion of the material was stored indoors at normal room temperature in an air conditioned office environment while another portion of the material was stored indoors at normal room temperature in a non-air conditioned warehouse environment. Over the course of a year, the samples were periodically removed from both locations, adhered to a stainless steel or plastic substrate, and tested for adhesive strength and holding power. Some of the samples were tested indoors while others were mounted outdoors on a stainless steel pipe situated beneath a cover that protected the samples from snow and rain. It was determined that the test material continued to exhibit adequate adhesive strength and holding power throughout the year-long test period, which is well beyond the 3-6 month life expectancy of the conventional water soluble adhesive paper described by way of background above in connection with FIGS. 1 and 2. Applicant believes that this result is achieved by virtue of the polymer blocking layer 10 providing a superior barrier to block adhesive material from leaching from the adhesive layer 6 to the paper layer 4.

Figure 6:
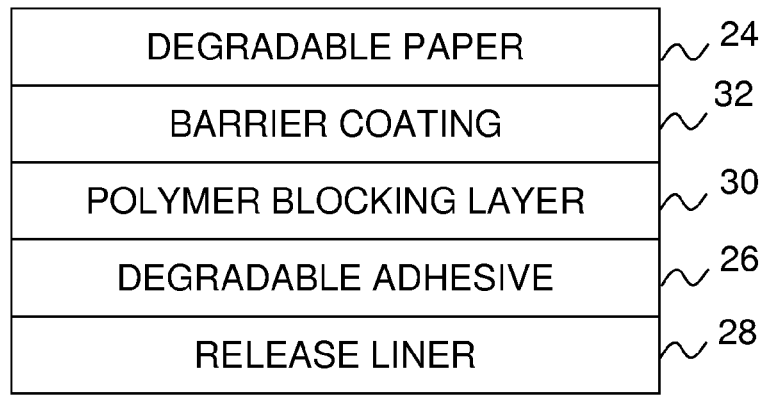
FIG. 6 is a side view of another adhesively backed degradable paper product constructed in accordance with the present disclosure.
Figure 7:
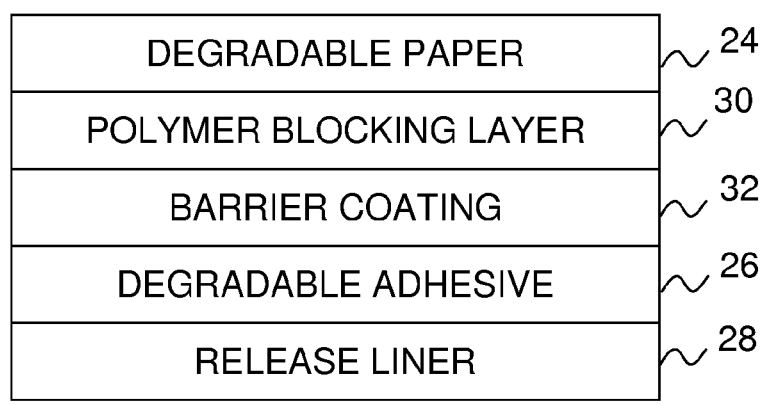
FIG. 7 is a side view of still another adhesively backed degradable paper product constructed in accordance with the present disclosure.

Turning now to FIG. 6, a water degradable paper article 22 representing an alternative embodiment of the present disclosure is shown. The article 22 is similar to the article 2 of FIG. 3 and thus includes a degradable paper layer 24, a degradable adhesive layer 26 and a release liner 28. A degradable polymer blocking layer 30 is also provided as a blocking layer between the paper layer 24 and the adhesive layer 26. However, instead of the polymer blocking layer 30 being in direct contact with the paper layer 24, a conventional barrier coating 32 as described by way of background above in connection with FIG. 2 is disposed on the paper layer. The article 22 of FIG. 6 may thus be constructed by modifying the construction of the conventional water soluble adhesive paper of FIG. 2, namely, by adding the polymer blocking layer 30 between the adhesive layer 26 and the barrier coating 32. FIG. 7 illustrates a modified construction 22A wherein the polymer blocking layer 30 is added between the paper layer 24 and the barrier coating 32.

Accordingly, a degradable paper article with a long-shelf-life adhesive backing has been disclosed. While various embodiments of the invention have been described, it should be apparent that many variations and alternative embodiments could be implemented in accordance with the teachings set forth herein. It will therefore be understood that the invention is not to be in any way limited except in accordance with the spirit of the appended claims and their equivalents.

What is claimed is:

1. A degradable paper article with long-shelf-life adhesive backing, comprising:
   a layer of degradable paper;
   a layer of degradable pressure-sensitive adhesive;
   a release liner on said adhesive layer; and
   a degradable polymer blocking layer disposed between said adhesive layer and said paper layer that blocks adhesive from bleeding into said paper.

2. An article in accordance with claim 1, wherein said paper layer comprises water degradable paper.

3. An article in accordance with claim 1, wherein said adhesive comprises water degradable adhesive.

4. An article in accordance with claim 1, wherein said release liner comprises a water degradable release paper or film.

5. An article in accordance with claim 1, wherein said polymer blocking layer comprises polyvinyl alcohol.

6. An article in accordance with claim 1, wherein said polymer blocking layer comprises one of a film or a coating.

7. An article in accordance with claim 1, wherein said polymer blocking layer is in direct contact with said adhesive layer.

8. An article in accordance with claim 1, wherein said polymer blocking layer is in direct contact with said paper layer.

9. An article in accordance with claim 1, wherein said article further includes a barrier coating disposed between said polymer blocking layer and said paper layer or between said polymer blocking layer and said adhesive layer.

10. An article in accordance with claim 1, wherein said article is one of an adhesive label or adhesive tape.

11. A method for fabricating a degradable paper article with long-shelf-life adhesive backing, comprising:
    providing a layer of degradable paper;
    providing a layer of degradable adhesive;
    providing a release liner on said adhesive layer; and
    providing a degradable polymer blocking layer disposed between said adhesive layer and said paper layer that blocks adhesive from bleeding into said paper.

12. A method in accordance with claim 11, wherein said paper layer comprises water degradable paper.

13. A method in accordance with claim 11, wherein said adhesive comprises water degradable adhesive.

14. A method in accordance with claim 11, wherein said release liner comprises a release paper or film.

15. A method in accordance with claim 11, wherein said polymer blocking layer comprises polyvinyl alcohol.

16. A method in accordance with claim 11, wherein said polymer blocking layer comprises one of a film or a coating.

17. A method in accordance with claim 11, wherein said polymer blocking layer is provided by spraying or coating a liquid polymer on one of said paper layer or said adhesive layer.

18. A method in accordance with claim 11, wherein said polymer blocking layer is provided by laminating or co-extruding a polymer film with one or more said paper layer or said adhesive layer.

19. A method in accordance with claim 11, further including providing a barrier coating disposed between said paper layer and said paper layer.

20. A water degradable paper article with long-shelf-life adhesive backing, comprising:
   a layer of water degradable paper;
   a layer of water degradable adhesive;
   a release liner on said adhesive layer;
   a polyvinyl alcohol layer disposed between said adhesive layer and said paper layer that blocks adhesive from bleeding into said paper;
   said polyvinyl alcohol layer comprising one of a film or a coating; and
   wherein said article is one of an adhesive label or adhesive tape.

21. A degradable paper article with long-shelf-life adhesive backing, comprising:
   a layer of degradable paper;
   a layer of degradable adhesive;
   a release liner on said adhesive layer;
   a barrier coating between said paper layer and said adhesive layer;
   a polyvinyl alcohol film disposed between said adhesive layer and said barrier coating that blocks adhesive from bleeding into said paper; and
   wherein said article is one of an adhesive label or adhesive tape.

22. A degradable paper article with long-shelf-life adhesive backing, comprising:
   a layer of degradable paper;
   a layer of degradable adhesive;
   a release liner on said adhesive layer;
   a barrier coating between said paper layer and said adhesive layer;
   a polyvinyl alcohol film disposed between said paper layer and said barrier coating that blocks adhesive from bleeding into said paper; and
   wherein said article is one of an adhesive label or adhesive tape.

* * * * *